United States Patent [19]
Fong et al.

[11] Patent Number: 5,555,263
[45] Date of Patent: Sep. 10, 1996

[54] METHOD AND APPARATUS FOR REDUCING SWITCHING OSCILLATIONS IN AN ISDN LINE INTERFACE CIRCUIT

[75] Inventors: Joseph C. Y. Fong; Mathew A. Rybicki, both of Austin, Tex.

[73] Assignee: Motorola Inc., Schaumburg, Ill.

[21] Appl. No.: 332,669

[22] Filed: Nov. 1, 1994

[51] Int. Cl.$^6$ ................................. H04L 25/12
[52] U.S. Cl. ............ 370/17; 370/79; 370/110.1; 379/28; 379/93; 379/394; 379/398; 375/254
[58] Field of Search ............... 370/13, 17, 79, 370/110.1; 375/220, 254, 258, 285, 296; 379/1, 27, 28, 93, 394, 398, 399

[56] References Cited

U.S. PATENT DOCUMENTS 4,797,904  1/1989  Dekker et al. ................ 375/60
4,856,058  8/1989  Sato et al. .................... 379/394

Primary Examiner—Douglas W. Olms
Assistant Examiner—Russell W. Blum

[57] ABSTRACT

A method and apparatus for limiting switching oscillations on an ISDN line interface circuit may be accomplished by sensing the current provided to the primary winding of the line coupling transformer (14). When the primary current is in a first pre-determined range, a first control signal (64) is generated such that a first impedance is applied across the primary winding during a trailing edge of the transformer switching. When the primary current is within a second pre-determined range, a second control signal (66) is produced that causes a second impedance to be imposed across a primary winding during the trailing edge of the transformer switching.

20 Claims, 3 Drawing Sheets

5,555,263

METHOD AND APPARATUS FOR REDUCING SWITCHING OSCILLATIONS IN AN ISDN LINE INTERFACE CIRCUIT

TECHNICAL FIELD OF THE INVENTION

This invention relates generally to line interface circuits and more particularly to an Integrated Service Digital Network (ISDN) line interface circuit

BACKGROUND OF INVENTION

The Integrated Service Digital Network "ISDN" Standard is known. The ISDN standard regulates the protocol of information transmissions over telephone lines. In particular, the ISDN standard regulates the rate at which information can be transmitted and in what format. The standard further requires that any system which desires to be ISDN compliant must be accoupled to the telephone lines, due to practical constraints; usually through a line coupling transformer that sources information on to the telephone lines within a template window. The template window specifications are defined in CCITTI.430 (I.430) of the ISDN standard.

Typically, the line coupling transformer is driven by a line driver circuit that includes four switching transistors configured as a full bridge inverter. In general, the full bridge inverter provides an alternating input to a primary winding of the line coupling transformer by enabling, during Ø1, a pair of transistors that couple to a supply voltage and a return to the primary, and, during Ø2, the other pair of transistors are enabled, such that the primary winding is coupled to supply and return in the opposite polarity of Ø1. The frequency and amplitude of the alternating input, and thus the output imposed on the secondary winding, is dictated by the transmission protocol of the ISDN standard (I.430).

Designing a line coupling circuit that includes a line coupling transformer and a line driver circuit to be compliant with the amplitude and phase requirements the I.430 specification is generally not a problem. There is a design problem, however, in complying with the transitional responses of the I.430. This problem arises because, at the trailing edge, i.e., when the alternating input is switching to the next state, the transformer and the telephone line produce a complex network that causes an oscillation, or ringing, to occur at the trailing edge. The magnitude of this ringing can easily take the switching wave form outside of the tolerance window provided by the I.430 specification.

One prior art solution to reducing the ringing at the trailing edge is disclosed in U.S. Pat. No. 4,797,904. This patent teaches momentarily providing a low impedance across the primary to effect the ringing on the trailing edge. In effect, what this patent teaches is changing the transfer function of the line coupling transformer and the telephone line during the trailing edge transition.

While this technique works well under certain load conditions, as the load on the telephone line changes so does the transfer function. As the transfer function of this circuit changes, the oscillation at the trailing edge varies. In some incidences, the oscillation varies to such a state that, even with the circuit of the U.S. Pat. No. 4,797,904, it exceeds the tolerance window dictated by the I.430 standard. Therefore, a need exists for a method and apparatus that substantially reduces the ringing on the trailing edge for varying load conditions.

DETAILED DESCRIPTION OF A PREFERRED EMBODIMENT

Generally, the present invention provides a method and apparatus for limiting switching oscillations on a line interface circuit. This is accomplished by sensing the current provided to a primary winding of a line coupling transformer. When the sensed current is in a first pre-determined range, a first control signal is generated such that a first impedance is applied across the primary winding during a trailing edge. When the sensed current is within a second pre-determined range, a second control signal is produced that causes a second impedance to be imposed across a primary winding during the trailing edge. With such a method and apparatus, when load variations on the telephone line occur, which changes the transfer function, oscillations on the trailing edge are minimized such that, no matter what the load conditions, ISDN line drive circuits comply with the I.430 specification or another type of telephony standard.

Figure 1:
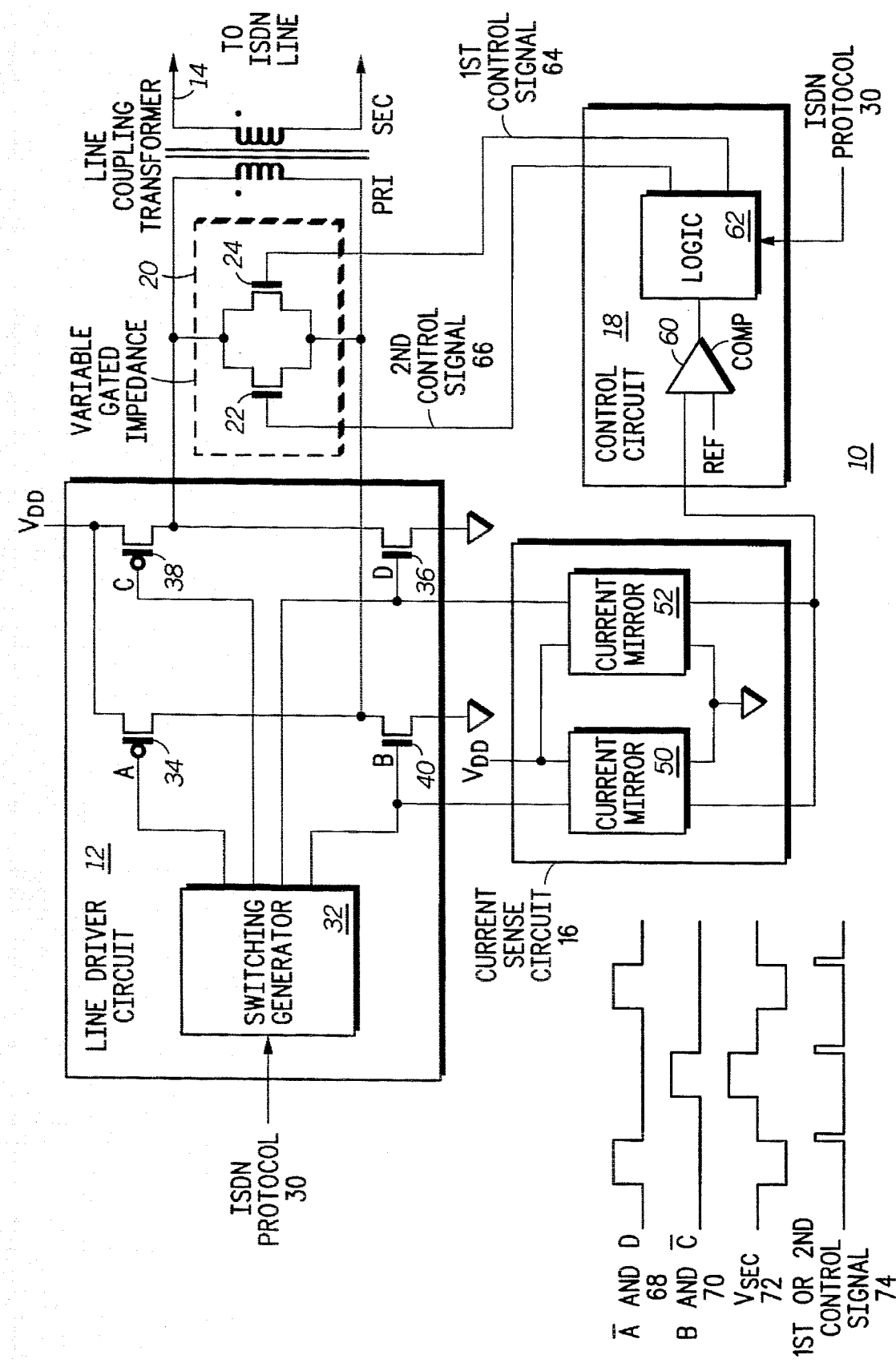
FIG. 1 illustrated blocked diagram of the line of the apparatus for limiting switching oscillations on an ISDN network line interface circuit in accordance with the present invention.

FIG. 1 illustrates a schematic block diagram of an ISDN line interface circuit 10. As shown the circuit, or apparatus, 10 includes a line driver circuit 12, a line coupling transformer 14, a current sense circuit 16, a control circuit 18, and a variable gated impedance 20. In operation, the ISDN protocol 30 provides information to the line driver circuit 12 to control the alternating input signals provided to the line coupling transformer 14. In particular, switching generator 32 receives the ISDN protocol 30 and generates switching signals for each of the transistors 34–40 of the line driver circuit 12. As shown, transistors 34 and 38 are P channel transistors while transistors 36 and 40 are N channel transistors. The transistors 34–40 are driven in accordance with the timing diagram which shows that transistor 34 and transistor 36 are enabled during one phase 68 while transistors 38 and 40 are activated during a subsequent phase 70. With this switching action, the voltage imposed across the secondary is shown in waveform 72.

While the alternating input signals are provided to the transformer 14, primary current is flowing and varies in magnitude depending on the load of the ISDN line coupled to the secondary of the line coupling transformer 14. For example, as the load across the secondary of line coupling transformer 14 decreases, the primary current increases. Conversely, when the load across the secondary increases, the primary current decreases. Sensing the primary current can be done in a variety of ways. For example, the current sense circuit 16 may include a pair of current mirrors 50–52. The current mirrors 50–52, which include scaled versions of transistors 36 and 40, sense the primary current to produce a sensed current. It should be apparent to one skilled in the art that the primary current may be sensed in a variety of ways. For example, a current sense transformer may be utilized wherein the current sense transformer is coupled in series with the primary winding. As another example, the current sense circuit 16 may be a current sense resistor coupled in the return path of transistor 36 and/or transistor 40.

While sensing the primary current, the current sense circuit 16 supplies the sensed current to the control circuit 18, which includes a comparator 60 and logic 62, and compares the current sense signal with a voltage threshold. When the sensed current value falls in a first predetermined range, which may occur when a voltage representation of the sensed current exceeds the voltage threshold, the logic circuit 62 generates the first control signal 64. When the sensed current is in a second pre-determined range, which may occur when the voltage representation of the sensed current is below the voltage threshold, the logic 62 produces a second control signal 66. In addition to producing the first and second control signals, the logic 62 may produce a third control signal when the sensed current falls into a third predetermined range. To one skilled in the art, selecting the voltage threshold, and the predetermined ranges, may vary depending the particular application. For example, assuming a 1:1 ratio on the transformer, the first predetermined range may be when the primary current is between 20 mili-amperes (mA) and 40 mA, while the second range may be when the primary current is less than 20 mA and the third predetermined range may be when the primary current is greater than 40 mA.

To produce the control signals 64–66, the logic 62 includes a plurality of logic gates that produces the control signal as shown in control signal waveform 74. In essence, the logic 62 takes the ISDN protocol 30, which includes waveforms 68–70, and generates either the second control signal 66 or the first control signal 64. To one skilled in the art, it will be appreciated that an almost endless combination of logic may be configured to produce the desired results. As an alternative to producing one control signal or the other, the logic may produce a third control signal, which may activate both signals 64 and 66.

As the control signals are generated, they are routed to the variable gated impedance 20. When the first control signal 64 has been generated, the variable gated impedance 20 imposes a first impedance across the primary of the line coupling transformer 14 and imposes a second impedance when the second control signal has been generated. The variable gated impedance 20 may include a pair of transistors 22 and 24, wherein transistor 24 is gated by the first control signal 64 and transistor 22 is gated by the second control signal 66. Thus, when the first control signal is enabled, transistor 24 is turned on applying a first impedance across the primary winding of the line coupling transformer 14 and, when the second control signal is enabled, transistor 22 is turned on applying a second impedance across the primary winding. Note that transistor 22 or transistor 24 is only on for a short period of time (<1 μSec) after the trailing edge and the impedance transistor 22 is greater than the impedance of transistor 24. Also note that when the control circuit 18 generates the third control signal, both transistor 22 and transistor 24 may be on.

While FIG. 1 illustrates the variable gated impedance 20 as a pair of transistors 22 and 24, the variable gated impedance 20 may be a digital resistive network. For example, the first and second control signals 64 and 66 may be digital signals that enable the resistive network to control the impedance imposed across the line coupling transformer. In addition, the resistive network would also need to include a switching element such that it can be switched in and out of the circuits.

Figure 2:
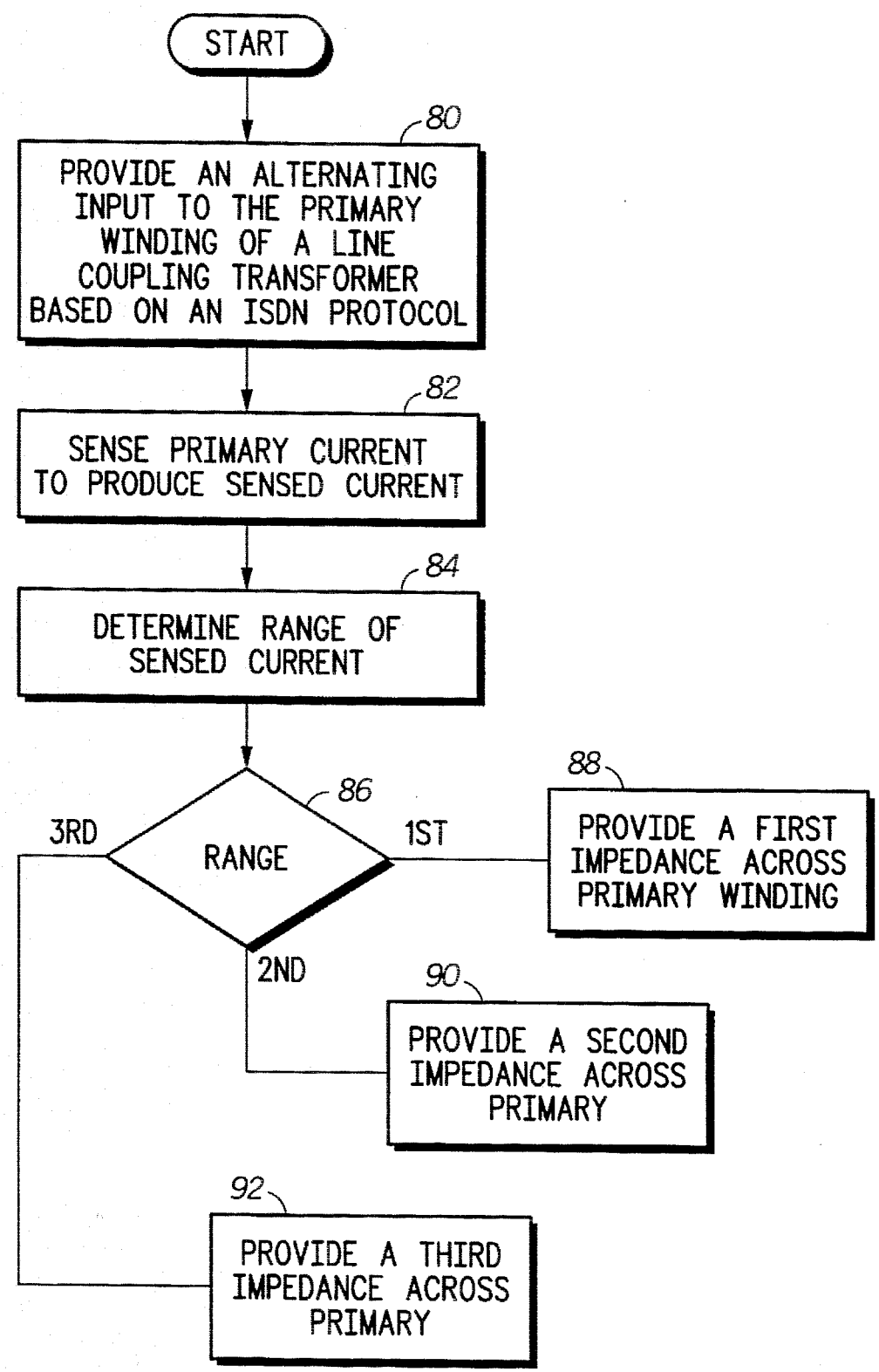
FIG. 2 illustrates a logic diagram that may be used to implement an embodiment the present invention.

FIG. 2 illustrates a logic diagram that may be used to implement the present invention. At step 80, an alternating input is provided to the primary winding of a line coupling transformer, wherein the alternating input is based on an ISDN protocol. While the line coupling transformer is providing current to the telephone line, at step 82 the primary current is sensed to produce sensed current. Having sensed the current, at steps 84 and 86, it is determined what pre-determined range the sensed current is within. When the sensed current is in the first pre-determined range, the proceeds to step 88 wherein a first impedance is applied across the primary winding during the trailing edges.

If it was determined that the sensed current falls within the second pre-determined range, the process proceeds to step 90 wherein a second impedance is provided across the primary winding during the trailing edges. Similarly, if the sensed current was determined to be within a third pre-determined range, a third impedance is implied across the primary winding during the trailing edge.

Figure 3:
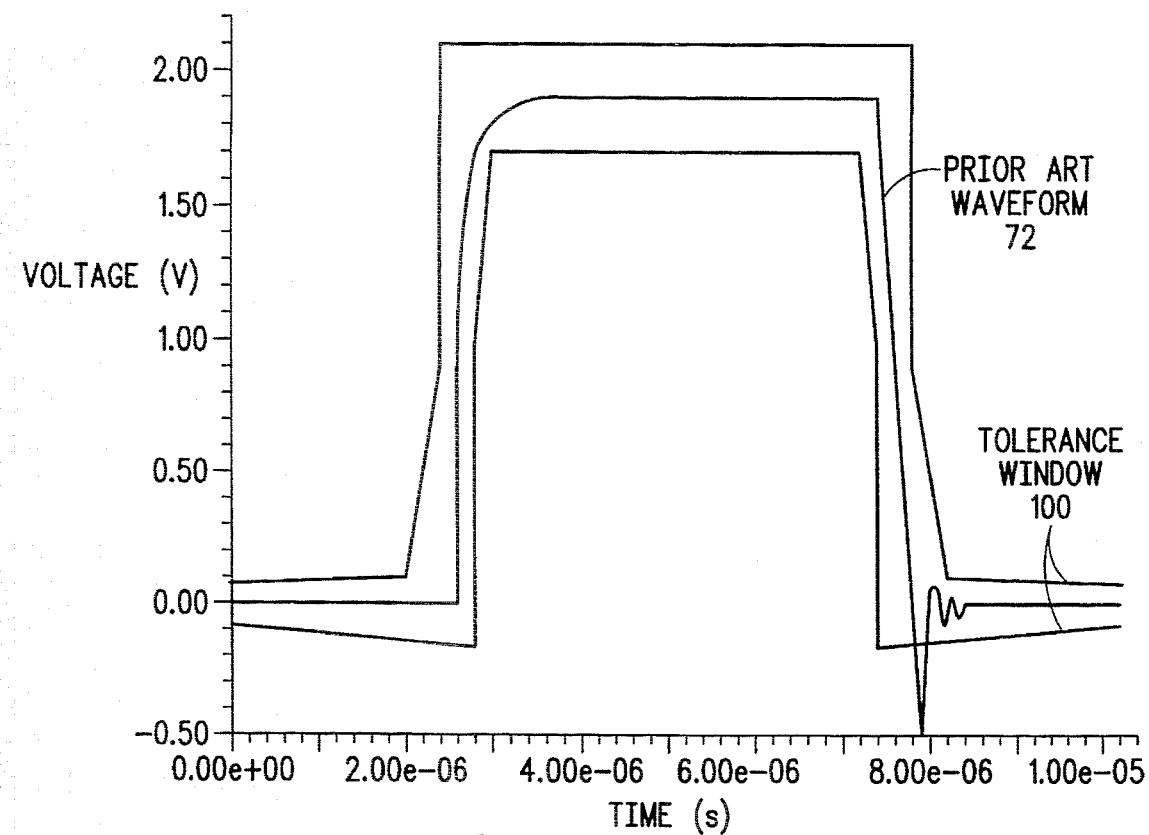
FIG. 3 illustrates a prior art wave form in relationship to the tolerance window dictated by the I.430 specification.

FIG. 3 illustrates a prior art wave form 72 in relationship to the tolerance window 100 as dictated by the I.430 specification. As shown, at the trailing edge of the wave form 72, an oscillation occurs which is beyond the tolerance window 100.

Figure 4:
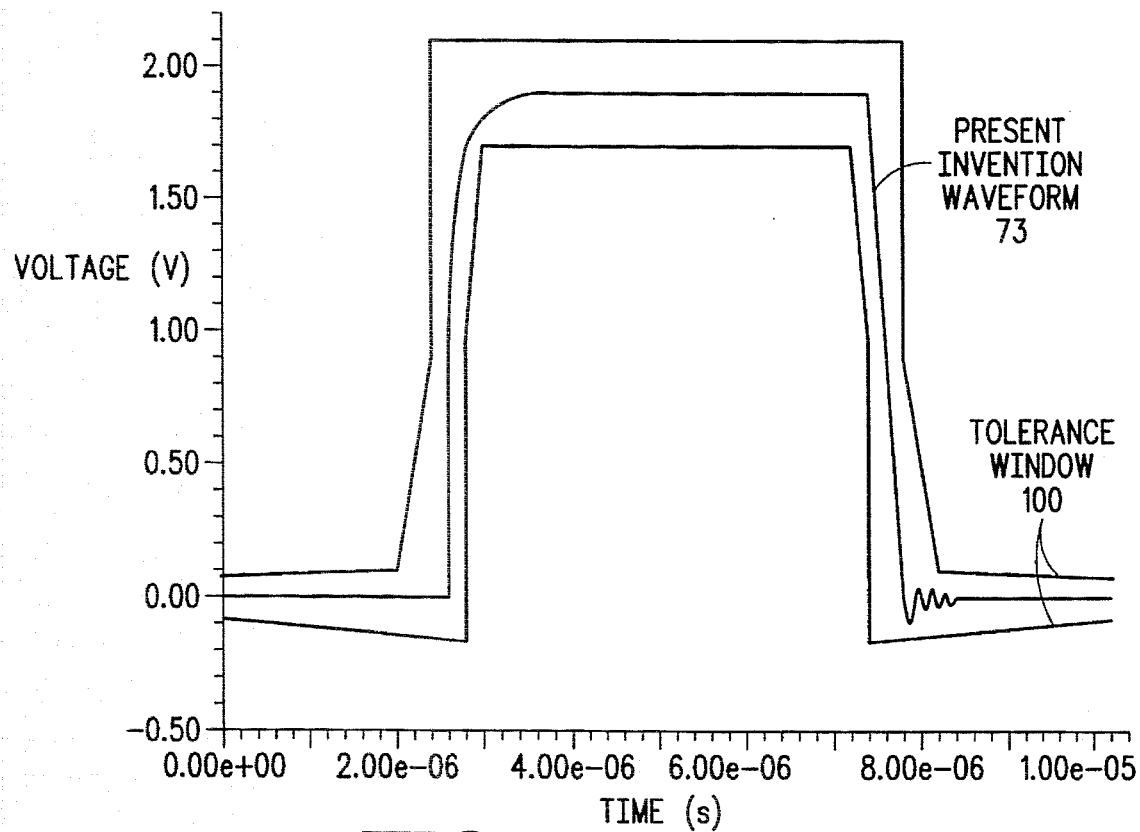
FIG. 4 illustrates the wave form in accordance with the present invention in relationship to the tolerance window dictated by the I.430 specification.

FIG. 4 illustrates the present invention wave form 73 in relationship to the tolerance window 100. As shown, at the trailing edge of the wave form 73, there still exists an oscillation but it is well within the tolerance window 100. Therefore, by utilizing the teachings of the present invention, the oscillations that occur at the trailing edge are reduced to be well within the tolerance window 100.

What is claimed is:

1. An apparatus for limiting switching oscillations on a line interface circuit, the apparatus comprising:

a line driver circuit operably coupled to a primary winding of a line coupling transformer, wherein the liner driver circuit provides an alternating input to the primary winding, and wherein the alternating input is based on a protocol of Integrated Services Digital Network;

a current sense circuit operably coupled to the line driver circuit, wherein the current sense circuit senses current that the line driver circuit provides to the primary winding to produce sensed current;

a control circuit operably coupled to the current sense circuit, wherein the control circuit provides a first control signal when the sensed current is in a first predetermined range and a second control signal when the sensed current is in a second predetermined range, and wherein the first control signal and the second control signal are based on the protocol; and a variable gated impedance comprising at least two transistors coupled in parallel across the primary winding, wherein a first transistor of the at least two transistors has a first impedance and is enabled when the first control signal is received, and a second transistor of the at least two transistors has a second impedance and is enabled when the second control signal is received, and the first impedance is less than the second impedance, such that switching oscillations are minimized.

2. The apparatus of claim 1, wherein the current sense circuit comprises a current sensing transformer.

3. The apparatus of claim 1, wherein the line driver circuit comprises four switching transistors configured as a full bridge inverter.

4. The apparatus of claim 3, wherein the current sense circuit comprises a current mirror coupled to at least one of the four switching transistors.

5. The apparatus of claim 3, wherein the current sense circuit further comprises at least one resistor coupled in series with at least one of the four switching transistors.

6. The apparatus of claim 1, wherein the control circuit comprises a comparator that compares a voltage representation of the sensed current to a voltage threshold, wherein, when the voltage representation is greater than the voltage threshold, the sensed current is in the first predetermined range, and wherein, when the voltage representation is less than the voltage threshold, the sensed current is in the second predetermined range.

7. The apparatus of claim 1, wherein the control circuit further comprises a third control signal which is generated when the sensed current is in a third predetermined range.

8. The apparatus of claim 7, wherein the variable gated impedance further comprises a third impedance which is imposed across the primary winding when the third control signal is received.

9. A method for reducing switching oscillations in an Integrated Services Digital Network line interface circuit, the method comprising the steps of:

providing an alternating input to a primary winding of a line coupling transformer, wherein the alternating input is based on a protocol of Integrated Services Digital Network;

when the alternating input is provided, sensing current of the primary winding to produce sensed current;

generating, based on the protocol, a first control signal when the sensed current is in a first predetermined range;

generating, based on the protocol, a second control signal when the sensed current is in a second predetermined range;

providing a first transistor across the primary winding, the first transistor having a first impedance when the first control signal is active; and providing a sound transistor across the primary winding, the second transistor having a second impedance that is greater than the first impedance when the second control signal is active.

10. The method of claim 9, wherein the generation steps further comprise comparing a voltage representation of the sensed current with a voltage threshold, wherein, when the voltage representation is greater than the voltage threshold, the sensed current is in the first predetermined range, and wherein, when the voltage representation is less than the voltage threshold, the sensed current is in the second predetermined range.

11. The method of claim 9 further comprises generating a third control signal when the sensed current is in a third predetermined range.

12. The method of claim 11, further comprises providing a third impedance across the primary winding when the third control signal is active.

13. An apparatus for limiting switching oscillations on a line interface circuit, the apparatus comprising:

a line driver circuit operably coupled to a primary winding of a line coupling transformer, wherein the liner driver circuit provides an alternating input to the primary winding, and wherein the alternating input is based on a protocol of Integrated Services Digital Network;

a current sense circuit operably coupled to the line driver circuit, wherein the current sense circuit senses current that the line driver circuit provides to the primary winding to produce sensed current;

a control circuit operably coupled to the current sense circuit, wherein the control circuit provides a first control signal when the sensed current is in a first predetermined range and a second control signal when the sensed current is in a second predetermined range, and wherein the first control signal and the second control signal are based on the protocol; and a variable gated impedance comprising a digital resistive network, wherein the digital resistive network provides a first impedance when the first control signal is received and provides a second impedance when the second control signal is received, and wherein the first impedance is less than the second impedance, such that switching oscillations are minimized.

14. The apparatus of claim 13, wherein the current sense circuit comprises a current sensing transformer.

15. The apparatus of claim 13, wherein the line driver circuit comprises four switching transistors configured as a full bridge inverter.

16. The apparatus of claim 15, wherein the current sense circuit comprises a current mirror coupled to at least one of the four switching transistors.

17. The apparatus of claim 15, wherein the current sense circuit further comprises at least one resistor coupled in series with at least one of the four switching transistors.

18. The apparatus of claim 13, wherein the control circuit comprises a comparator that compares a voltage representation of the sensed current to a voltage threshold, wherein, when the voltage representation is greater than the voltage threshold, the sensed current is in the first predetermined range, and wherein, when the voltage representation is less than the voltage threshold, the sensed current is in the second predetermined range.

19. The apparatus of claim 13, wherein the control circuit further comprises a third control signal which is generated when the sensed current is in a third predetermined range.

20. The apparatus of claim 19, wherein the variable gated impedance further comprises a third impedance which is imposed across the primary winding when the third control signal is received.

* * * * *

UNITED STATES PATENT AND TRADEMARK OFFICE
CERTIFICATE OF CORRECTION

PATENT NO. : 5,555,263
DATED : September 10, 1996
INVENTOR(S) : Joseph Chan Yan Fong, et. al.

It is certified that error appears in the above-identified patent and that said Letters Patent is hereby corrected as shown below:

In Claim 9, column 5, line 41;
after "providing a", change "sound" to read - -second- -.

Signed and Sealed this

Ninth Day of February, 1999

Attest:

Attesting Officer

*Acting Commissioner of Patents and Trademarks*